United States Patent [19]

Huebner et al.

[11] Patent Number: 5,007,536

[45] Date of Patent: Apr. 16, 1991

[54] PACKAGING CONTAINER FOR A PLURALITY OF RECORDING MEDIA IN THE FORM OF A CIRCLE

[75] Inventors: Dietmar Huebner, Oberkirch; Peter Nagel, Willstaett; Ekkehard Hirschberg, Weinheim; Klaus Schoettle, Heidelberg; Bozidar Pavelka, Willstaett, all of Fed. Rep. of Germany

[73] Assignee: BASF Aktiengesellschaft, Ludwigshafen, Fed. Rep. of Germany

[21] Appl. No.: 470,379

[22] Filed: Jan. 25, 1990

[51] Int. Cl.⁵ .............................. B65D 85/67
[52] U.S. Cl. .................... 206/394; 206/303; 206/408; 206/416; 220/4.24
[58] Field of Search ............... 206/303, 394, 403, 408, 206/413, 415, 416, 508, 523, 311, 312, 444; 220/4 B, 4 E

[56] References Cited

U.S. PATENT DOCUMENTS

| | | | |
|---|---|---|---|
| 3,070,257 | 12/1962 | Bojanowski | 206/508 |
| 3,206,016 | 9/1965 | Fowle et al. | 206/403 |
| 3,251,460 | 5/1966 | Edmonds | 220/4 E |
| 3,252,568 | 5/1966 | Steidinger | 220/4 E |
| 3,335,855 | 8/1967 | Gawlick | 206/444 |
| 3,465,875 | 9/1969 | McKelvey, Jr. | 206/444 |
| 3,913,741 | 10/1975 | Pirie | 206/508 |
| 4,174,039 | 11/1979 | Frankhuizen | 206/444 |
| 4,185,313 | 1/1980 | Green et al. | 206/444 |
| 4,195,733 | 4/1980 | Abel | 206/403 |
| 4,233,586 | 11/1980 | Kaplow et al. | 206/444 |
| 4,708,246 | 11/1987 | Minion | 206/416 |
| 4,761,629 | 8/1988 | Martin et al. | 220/4 E |
| 4,823,956 | 4/1989 | Belisle | 206/416 |
| 4,826,005 | 5/1989 | Tajima et al. | 220/4 E |
| 4,844,263 | 7/1989 | Hadtke | 206/508 |
| 4,874,085 | 10/1989 | Grobecker et al. | 206/311 |

FOREIGN PATENT DOCUMENTS 2312400 9/1974 Fed. Rep. of Germany .

Primary Examiner—David T. Fidei
Attorney, Agent, or Firm—Keil & Weinkauf

[57] ABSTRACT

A packaging container for a plurality of circular recording media is formed from substantially identical container parts which, after being combined, have a continuous longitudinal tooth system in the circumferential direction and at least one partial transverse tooth system in the radial direction. Toothed edge parts of the container parts engage one another. Stacking means are provided. Recording media to be packaged are any type of recording media in circular form, such as wound films, magnetic tapes or recording disks.

14 Claims, 6 Drawing Sheets

PACKAGING CONTAINER FOR A PLURALITY OF RECORDING MEDIA IN THE FORM OF A CIRCLE

BACKGROUND OF THE INVENTION AND PRIOR ART

The present invention relates to a packaging container for a plurality of recording media which are stacked one on top of the other and are circular in form, in particular tape-like recording media wound as rolls of tape on annular hubs or flanged reels, a central holder being assigned to at least one of the hubs or flanged reels, and at least two bottom and lid parts which, in plan view, are slightly larger than the planview area of the full hubs or of the flanged reels and which are equipped with detachably connectable toothed edge parts being provided.

Recording media are understood as being any type of recording media in the form of a circle, for example recording media which can be wound up, in particular magnetic recording media, for example photographic films, magnetic films and magnetic tapes, and any type of recording disks, such as compact disks, gramophone disks, video disks and computer disks.

Magnetic tapes are commercially available wound on flangeless hubs or flanged reels according to DIN 45,517. The hubs or reels are flat on both end faces and can therefore be locked only by additional locking means when a plurality of the said hubs or reels are stacked one on top of the other. The roll of tape is usually despatched packed in a cardboard box having shell-like plastic liners. This packaging is uneconomical and inconvenient to handle. The use of liners made of polystyrene foam or similar foam materials is disadvantageous with regard to simple waste disposal.

German Utility Models 8034894 and 8109502 disclose cake box-like packagings for wound magnetic tapes or recording disks, which, however, have the disadvantage that the upper part and lower part differ in shape and are therefore expensive to produce.

German Laid-Open Application DOS 2,312,400 furthermore discloses transport protection for video disks, which consists of a shipment container formed from two combinable elements, the bottom surfaces having depressions in the region of the video disk information relief to be protected. The known shipment container has, for example, a roughly quadratic plan and a roughly rectangular or oblique separation line. For example, the shipment container possesses tooth systems even transverse to the wall and along the peripheral direction and the two elements may be identical in shape.

The arrangement of the separation lines is such that the video disks cannot enter between the container elements and open them. Since the video disks are not dust-sensitive, there is also no need to provide for a high level of protection from dust in the design of the separation lines.

German Utility Model 8229387 discloses a housing for compact cassettes, which has tooth systems on the peripheral edge which, however, are intended to increase the torsional rigidity of the housing. The upper and lower parts of the housing differ from one another, at least with respect to the tooth systems.

It is an object of the present invention to improve the packaging container of the type defined at the outset and to produce it more economically.

SUMMARY OF THE INVENTION

We have found that the object is achieved by a packaging container for a plurality of recording media which, at least after having been wound into roll form, have the shape of flat annular disks and are axially stacked on top of each other between two identical end members each having a skirt portion such that said members when assembled with said skirt portions in mutually abutting relationship, envelop the stack of recording media in the form of a box, said disk-shaped recording media being centered within said box by a central holder provided in each said end member, said skirt portion having a multitude of teeth extending in a continuous zigzag patter around the circumference of the skirt portion, the teeth of said two members tightly interfitting upon assembly of the box and the height of the largest tooth corresponding roughly to the internal height of the container, and said members also having a transverse system of teeth extending radially of the container, such that the separation line between the two end members is greatly lengthened and both the stability of the container and its protection against the penetration of dust are substantially increased.

In practice, the container may possess a cake box shape having the contour of an even-numbered polygon, in particular an octagonal shape.

As mentioned above, the height of the largest toothed parts of the longitudinal tooth system corresponds roughly to the internal height of the container. This, in conjunction with the large number of teeth provided, greatly lengthens the separation line between the two end members—also referred to herein as bottom and lid parts—and thus counteracts the disengagement of the two end members from each other after assembly; and it makes it easy to grip the recording media at the circumference, and handling is thus facilitated. In an advantageous embodiment, no linear gaps should lead into the interior of the container from the separation line of the longitudinal tooth system.

The transverse tooth system is thus provided continuously around the entire circumference of the container or extends substantially over the circumference.

As indicated, the longitudinal tooth system may have a visible separation line of pronounced zig-zag shape, with the result that the forces uniting the container parts can be increased. It is also advantageous from the point of view of production if the individual toothed parts are provided with beveled tooth flanks. To facilitate handling, the central holder can be in the form of a cylinder body having at least one axial gripping groove.

Advantageously, the cylinder body may be formed from two cylinder body parts, and furthermore the cylinder body parts may have tooth means on their end faces.

It is also advantageous if the tooth means consist of intermeshing annular sector parts. For transport in the vertical position, it is advantageous if the bottom and lid parts have substantially flat outer surfaces which have at most shallow recessed and raised stacking means (indentations and protrusions). In this transport position, the connecting forces between bottom and lid parts play a particularly important role.

For stacking only bottom parts or only lid parts one on top of the other, it is advantageous if the outer surface of the bottom part (lid part) has a circumferential groove as a recessed stacking means, resulting in a radially inner raised stacking means, and the toothed edge parts of the bottom part (lid part) have support surfaces for the said inner raised stacking means of the bottom part (lid part).

For stacking the complete containers or the bottom and lid parts in any sequence, the recessed and raised stacking means on bottom and lid parts can be such that they fit into one another, in particular are identical.

BRIEF DESCRIPTION OF THE DRAWINGS

Embodiments of the invention are illustrated in the drawing and described below.

In the drawings.

DETAILED DESCRIPTION OF THE PREFERRED EMBODIMENTS

Figure 1:
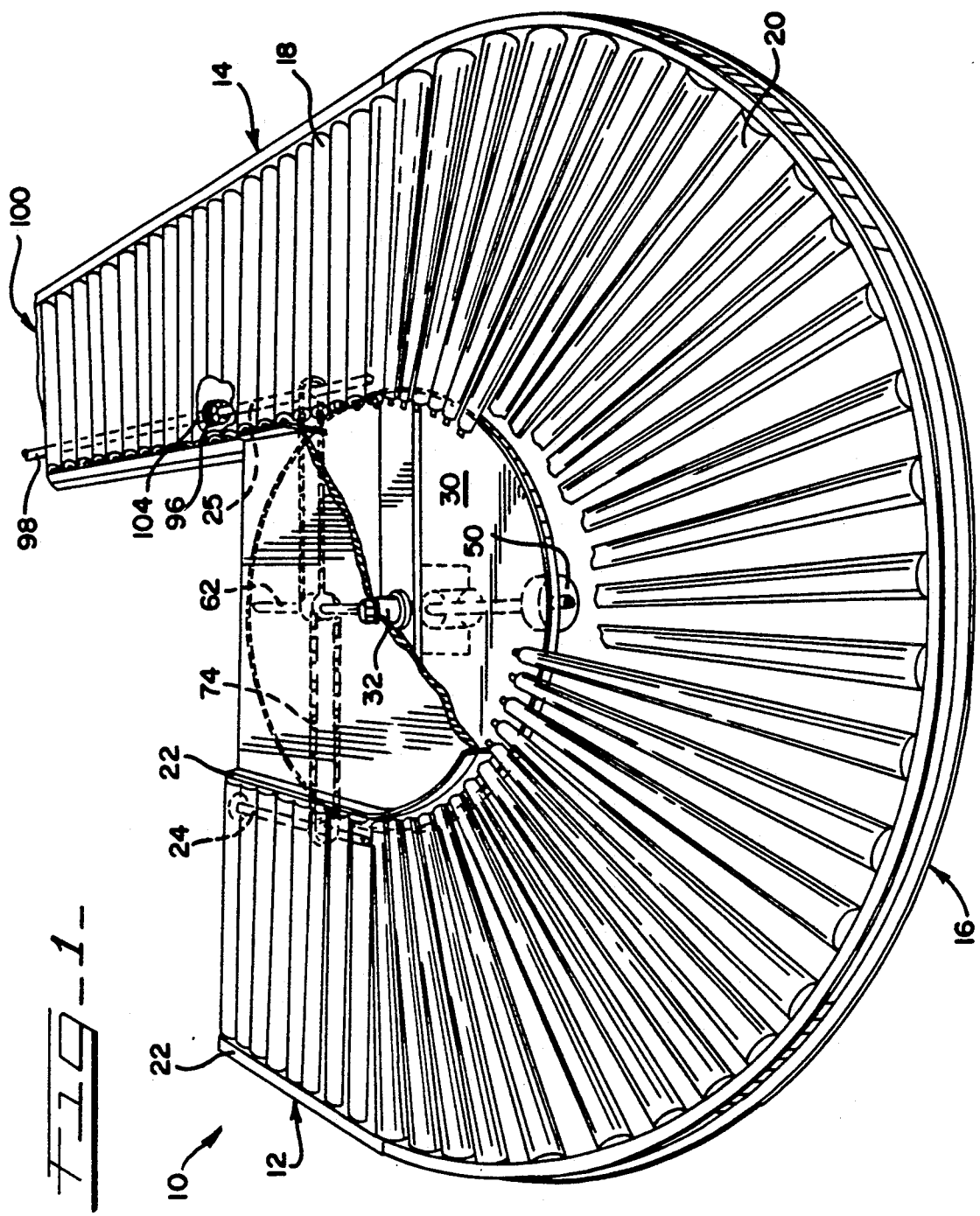
FIG. 1 shows an approximately octagonal container having a zig-zag separation line.

The container 5 from FIG. 1 has a multi-step zig-zag separation line 6, the height of the largest toothed parts 7A and 7B corresponding to the internal height h of the container. The transverse tooth system 8 recognizable in the sector section of FIG. 1 is in the form of an inner edge 9 on the largest toothed part 7A or 7B, which engages a corresponding groove 10 of the particular baseplate 11B or 11A of the bottom or lid part 12, respectively. The recording media 14 are housed in the interior 13 of the container 5.

The container 5 consists, for example, of Styropor ® (registered trade mark of BASF Aktiengesellschaft, Ludwigshafen) but may consist of any suitable foamed plastic or other suitable materials which can be processed by pressing, casting, injection molding or deep drawing.

Figure 2:
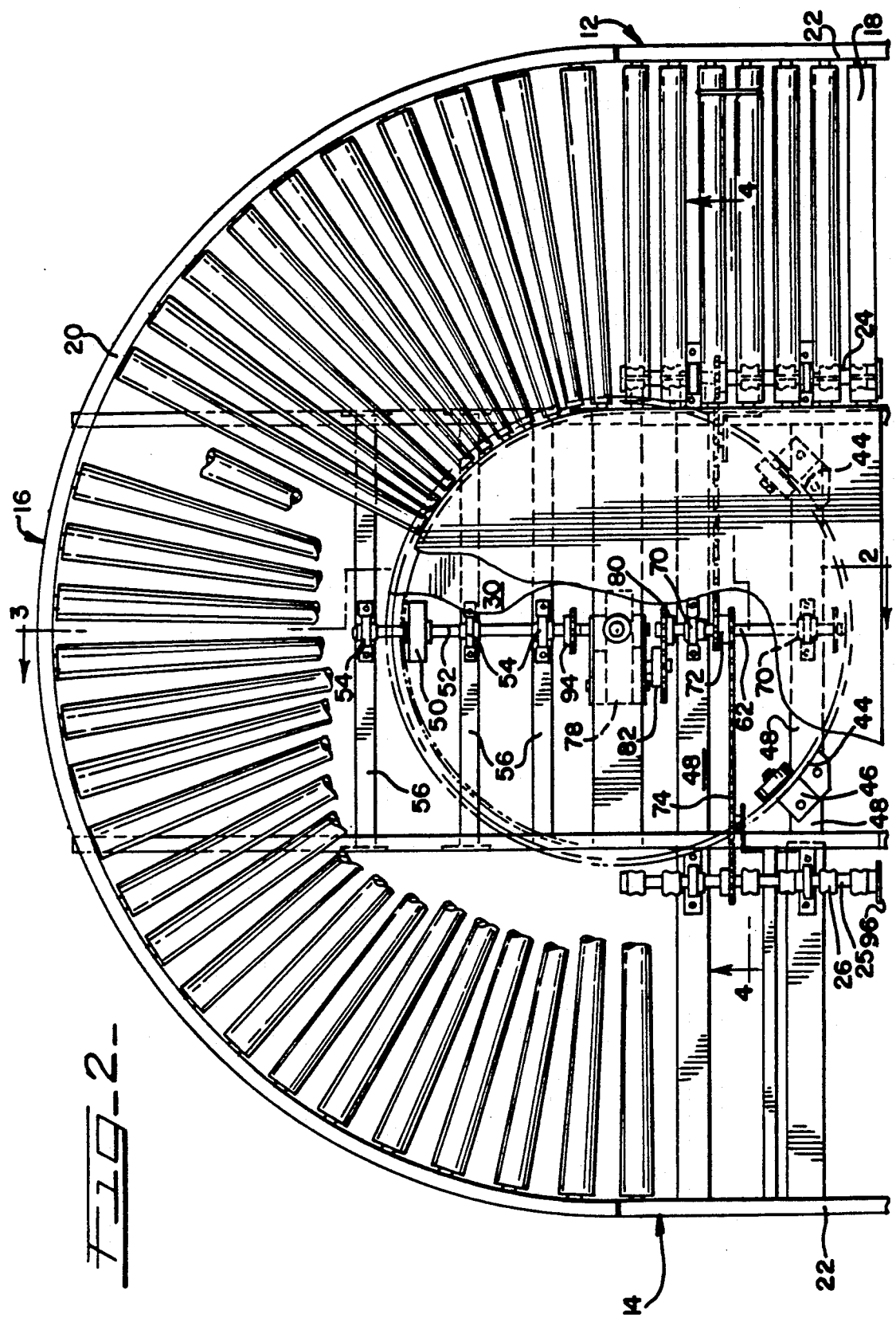
FIG. 2 shows a first section through the lid part of the container from FIG. 1 (along line A-A')

The lid part 12 in FIG. 2, which, like the container parts to be described below, is identical to its counterpart, is formed by the substantially flat baseplate 11A, on which the recording media 14 can lie flat, and by edge parts which comprise the largest toothed parts 7A on the one hand and middle edge parts 15 on the other hand, the tooth recess 16 being provided between these middle edge parts. The middle edge parts 15 extend in height as far as the central plane M of the container and have toothed edge parts 17 and 18 which are preferably adjacent to one another in the longitudinal direction and whose shapes are such that they fit into one another. The toothed parts 7A (7B) are likewise provided on their end faces with toothed edge parts, in this case webs 19 and grooves 20, the webs 19 engaging sector grooves 21 (FIG. 3) when the two container parts are combined. The tooth elements of the edge parts 17 to 21 form the transverse tooth system, which preferably extends over the entire circumference of the container 5, or which extends substantially around the circumference.

Figure 3:
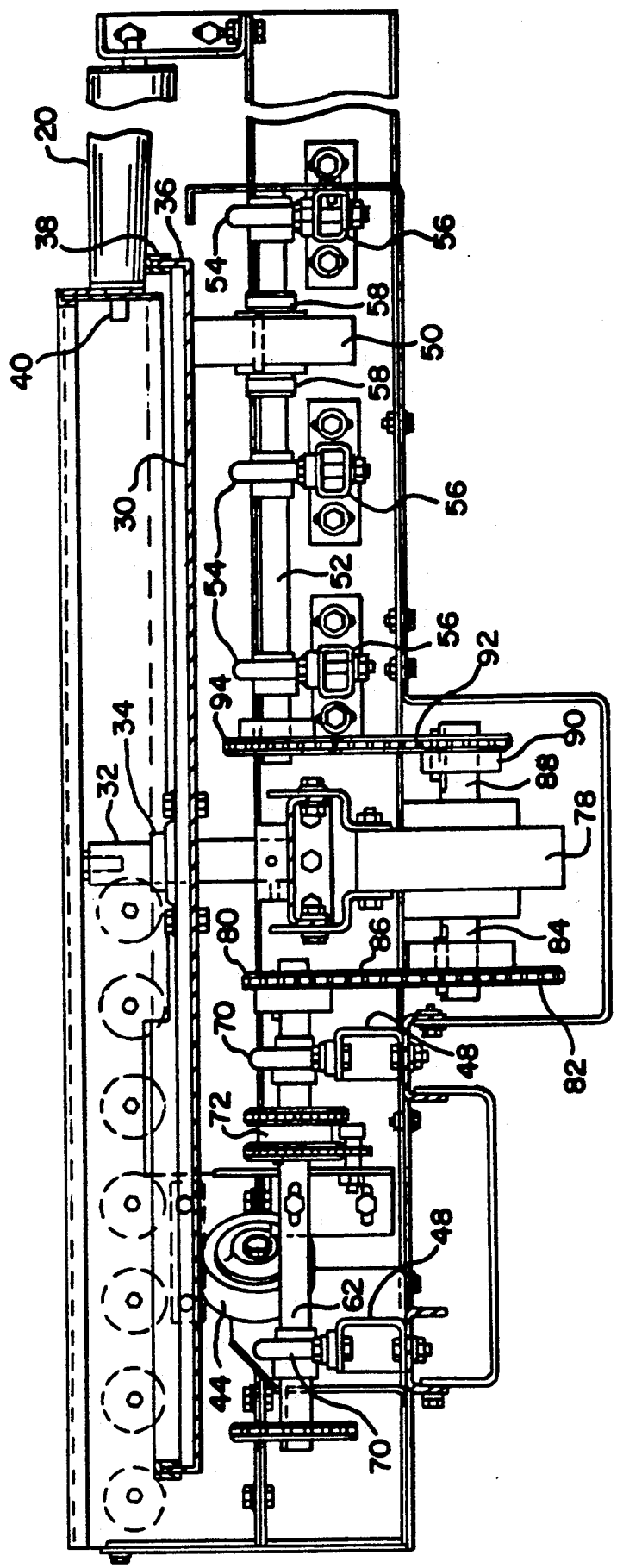
FIG. 3 shows a second section through the bottom part of the container from FIG. 1 (along line B-B')

A central holder of container 5 is in the form of cylinder body parts 22 having two toothed sector webs 23 on the end face, each of which extends only over a circular sector of 90°. The cylinder body parts 22 are also provided with two gripping grooves 24 which are recognizable in FIG. 3 and each of which is formed between the sector webs 23 and is provided with support surfaces 25 for the sector webs 23. In FIG. 3, the large toothed part 7A is also provided with two lateral webs 26 which are intended for engaging lateral grooves 27 as middle edge parts 15.

Both lid and bottom parts 12 are thus identical and can be produced in the same mold. After two lid parts 12 have been combined, it being necessary for one part to be rotated 90° with respect to the other and inverted, the recording media 14 are safely protected therein. Depending on the gripping effect of the surface of the plastic used, it may be necessary, as shown in FIG. 1, to use pieces of adhesive tape 28, which extend along the separation line 6, to ensure reliable closure of the container parts 12, particularly if the container is also to be transported on edge, on one of its resting surfaces 29. Banding of the entire container can also be provided for this purpose. The bottom and lid parts 12 have substantially flat outer surfaces which, in FIG. 1, possess flat recessed stacking means (indentations) 42 and raised stacking mean 43 in the form of circular sectors.

Figure 4:
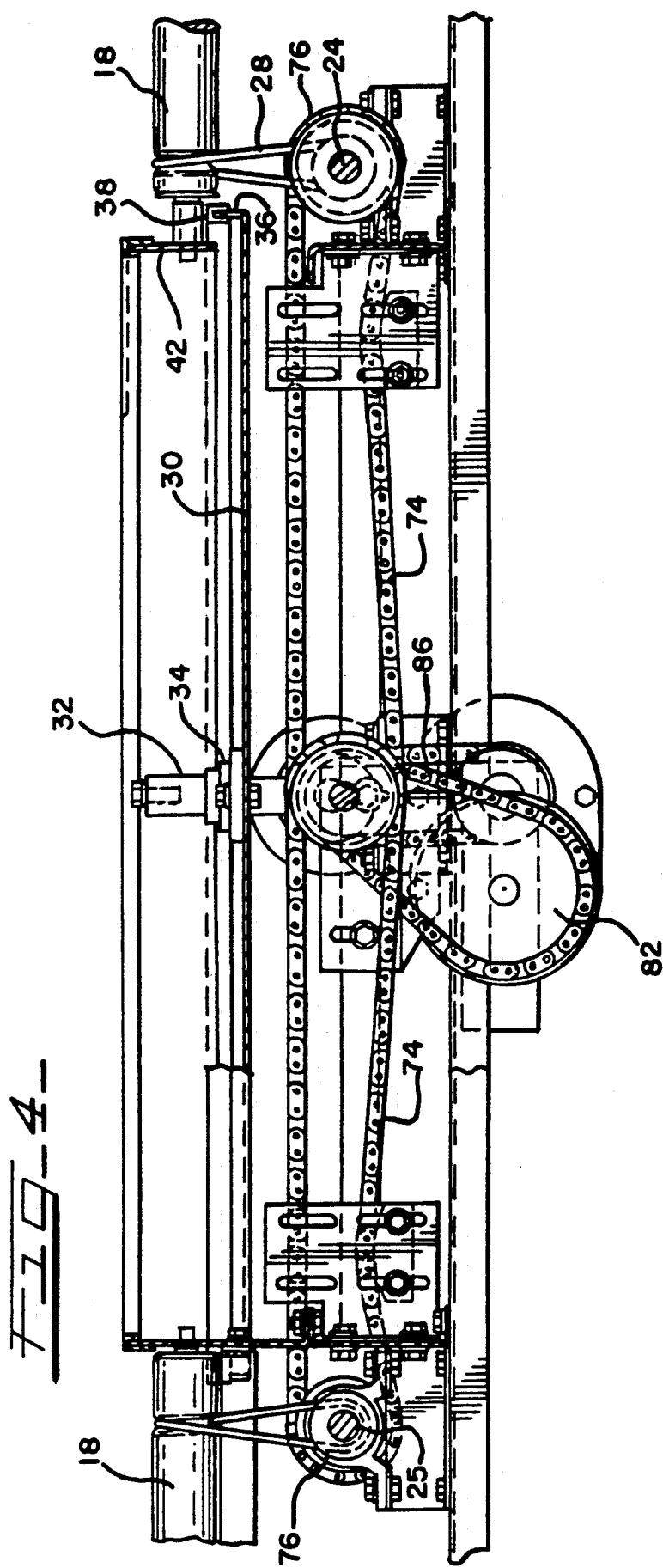
FIG. 4 shows an octagonal container having an oblique zig-zag separation line.
Figure 5:
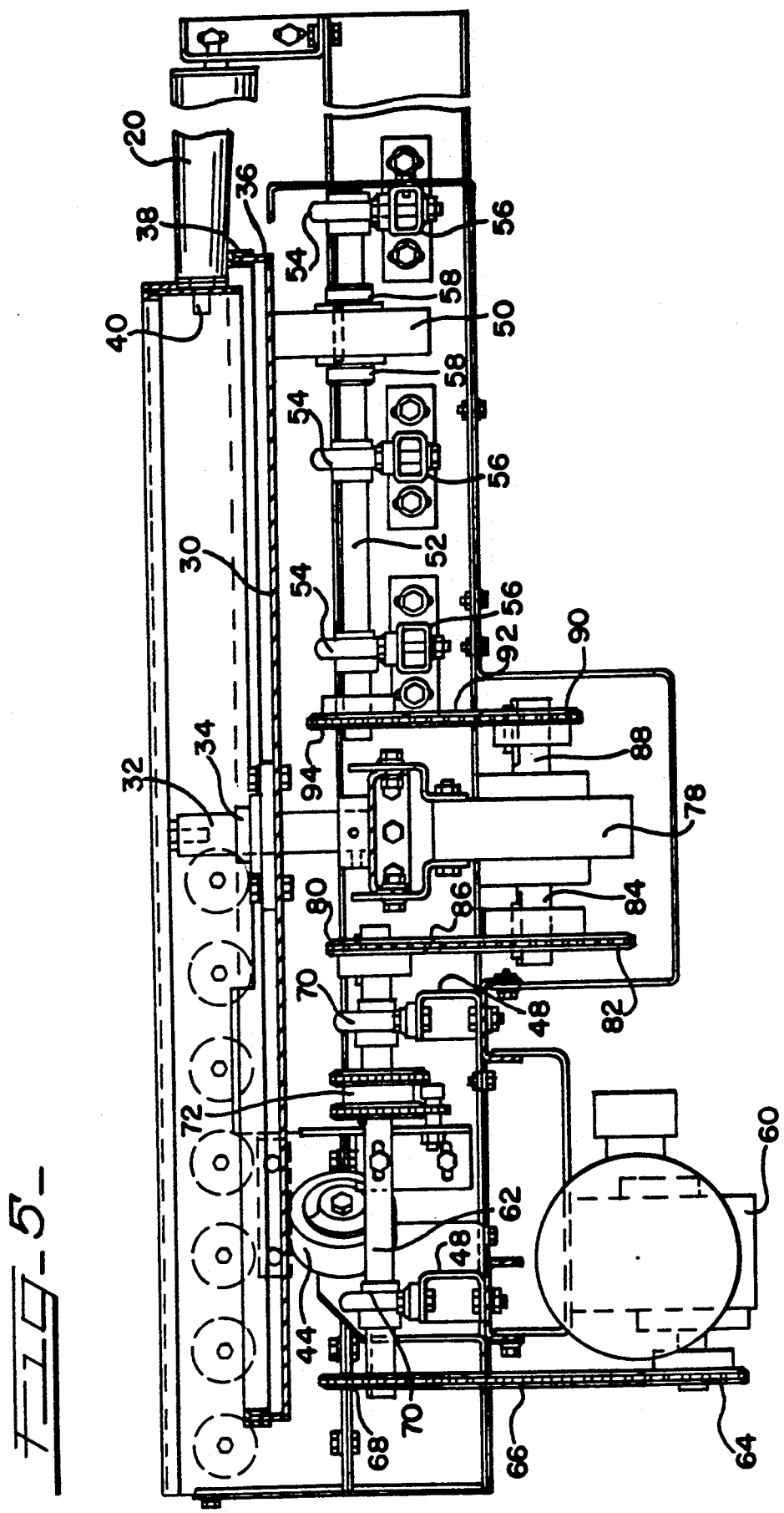
FIG. 5 shows a first section through the container from FIG. 4 (along line C-C') and FIG. 6 shows a second section through the container from FIG. 4 (along line D-D').
Figure 6:
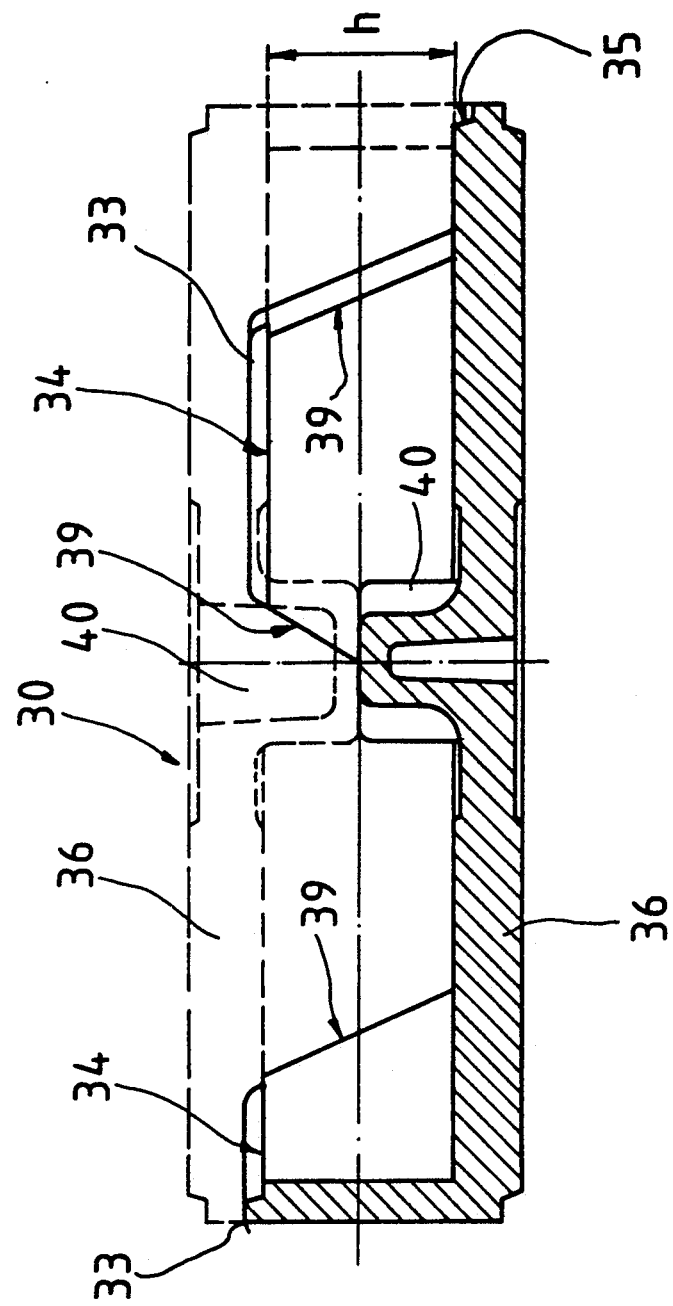

FIG. 4 shows another container 30 which, in contrast to the multi-step zig-zag separation line 6, has an oblique zig-zag separation line 31.

Oblique, trapezoidal toothed parts 32 are identical to one another and are each provided symmetrically with respect to each corner. The toothed parts 32 have outer webs 33 and inner recesses 34 as edge parts on their end faces, the outer webs 33 engaging the corner grooves 35 when the two container parts 36 are combined. The baseplate 37 is in turn flat, to ensure that there is no slipping of the recording media, in particular of the self-supporting magnetic tape roll, which in this case too has been wound on flangeless hubs 38.

In the present container 30, the oblique edges 39 are not provided with transverse tooth means, which, however, can readily be supplemented in such a way that one edge is provided with a web and the other edge of the same toothed part with a matching groove.

The central holder 40 in this case is in the form of cylinder body parts 40A and 40B, between which a space is provided. If it is necessary to transport a container in the upright position, especially because of the weight of the recording media, for example half inch video tape roll, and/or because of the container material, the cylinder body parts can be provided with tooth means on their end faces, similarly to FIGS. 1 to 3 or in another suitable manner, to increase the stability of the filled container to lateral opening and disintegration of the stack of recording media. The cylinder body parts 40A and 40B are provided with axial gripping grooves 41.

In FIG. 4, it can be seen that a circumferential groove 44 and a resulting raised area 45 are provided as stacking means. The inner recesses 34 have dimensions such that two lid or bottom parts 36 can be stacked one on top of the other in the same position (toothed parts 32 pointing upward), the outer edge of the raised area 45 resting on the horizontal support surfaces of the inner recess 34.

Hence, the individual lid or bottom parts can very advantageously be used as a product support and protection means in the production of the recording media.

A packaging container for a plurality of circular recording media is formed from identical container parts which, in combination, have a continuous longitudinal tooth system in the circumferential direction and at least one partial transverse tooth system in the radial direction. Toothed edge parts of the container parts engage one another. Stacking means are provided.

Recording media are any type of recording media in the form of a circle, such as wound film, magnetic tapes or recording disks.

We claim:

1. A packaging container for a plurality of recording media which, at least after having been wound into roll form, have the shape of flat annular disks and are axially stacked on top of each other between two identical end members each having a skirt portion such that said members when assembled with said skirt portions in mutually abutting relationship, envelop the stack of recording media in the form of a box, said disk-shaped recording media being centered within said box by a central holder provided in each said end member, said skirt portion having a multitude of teeth extending in a continuous zigzag pattern around the circumference of the skirt portion, the teeth of said two members tightly interfitting upon assembly of the box and the height of the largest tooth corresponding roughly to the internal height of the container, and said members also having a transverse system of teeth extending radially of the container, such that the separation line between the two end members is greatly lengthened and both the stability of the container and its protection against the penetration of dust are substantially increased.

2. A container as claimed in claim 1, wherein said skirt portions have the contour of an even-numbered polygon.

3. A container as claimed in claim 2, wherein said skirt portions have an octagonal contour.

4. A container as claimed in claim 1, wherein said transverse to the system is of such a design that no linear gap leads into the interior of the container from the separation line of the circumferential tooth multitude.

5. A container as claimed in claim 1, wherein the individual teeth of said multitude are provided with beveled tooth flanks.

6. A container as claimed in claim 1, wherein the central holder is in the form of a cylinder body having at least one outer axial gripping groove.

7. A container as claimed in claim 6, wherein the cylinder body is formed from two cylinder body parts.

8. A container as claimed in claim 7, wherein the cylinder body is formed from two cylinder body parts which have tooth means on their end faces.

9. A container as claimed in claim 8, wherein the cylinder body is formed from two cylinder body parts which have, on their end faces, tooth means consisting of intermeshing annular sector parts.

10. A container as claimed in claim 1, wherein the end members have substantially flat outer surfaces which have at most shallow recessed and raised stacking means.

11. A container as claimed in claim 10, wherein the outer surface of the end members has a circumferential groove as a recessed stacking means, resulting in a radially inner raised stacking area, and the teeth of the end members have support surfaces for said raised stacking means.

12. A container as claimed in claim 10, wherein the outer surface of the end members has a circumferential groove as a recessed stacking means, resulting in a radially inner raised stacking means, and the teeth of the end members have inner recesses for accepting said inner raised stacking means.

13. A container as claimed in claim 1, wherein recessed and raised stacking means which fit into one another are provided on the outer surface of the end members.

14. A container as claimed in claim 1, wherein recessed and raised stacking means which are substantially identical to each other are provided on the outer surface of the end members.

* * * * *

UNITED STATES PATENT AND TRADEMARK OFFICE
CERTIFICATE OF CORRECTION

PATENT NO. : 5,007,536
DATED : Apr 16, 1991
INVENTOR(S) : Dietmar HUEBNER et al.

It is certified that error appears in the above-identified patent and that said Letters Patent is hereby corrected as shown below:

On the title Page:
    Please Insert

-- [30] Foreign Application Priority Data
       Jan 25, 1989 [DE] Fed. Rep. of
                          Germany ...... G8900764.6 --

Signed and Sealed this

Sixth Day of October, 1992

Attest:

DOUGLAS B. COMER

*Attesting Officer*    *Acting Commissioner of Patents and Trademarks*